United States Patent [19]

Nakamura

[11] 4,367,943

[45] Jan. 11, 1983

[54] APPARATUS FOR PROVIDING RECORDING COMPENSATION FOR ROTATING DRUM SPEED FLUCTUATIONS IN AN INFORMATION RECORDING APPARATUS

[75] Inventor: Hiroya Nakamura, Hachioji, Japan

[73] Assignee: Konishiroku Photo Industry Co., Ltd., Tokyo, Japan

[21] Appl. No.: 244,630

[22] Filed: Mar. 17, 1981

[30] Foreign Application Priority Data

Mar. 21, 1980 [JP] Japan ................... 55/34729
Apr. 25, 1980 [JP] Japan ................... 55/54371

[51] Int. Cl.³ .................................. G03G 15/00
[52] U.S. Cl. ................................. 355/3 R; 354/5; 101/DIG. 13
[58] Field of Search .............. 355/3 R, 14 R, 20; 354/5; 346/153.1, 155, 156; 101/DIG. 13

[56] References Cited

U.S. PATENT DOCUMENTS

| | | | |
|---|---|---|---|
| 3,912,390 | 10/1975 | Herten | 355/14 R |
| 3,917,396 | 11/1975 | Donohue et al. | 355/14 R |
| 4,175,851 | 11/1979 | Kitamura et al. | 355/14 R |

Primary Examiner—R. L. Moses
Attorney, Agent, or Firm—Jordan B. Bierman; Linda Bierman

[57] ABSTRACT

Recording compensation for fluctuations in the moving speed of an electrostatic latent image receiving member is provided by apparatus which generates a train of pulses in response to such movement to synchronize the impression on the member of lines of character information supplied in the form of electric signals. When the speed of the member is slower than normal such that supply of the character signals is completed earlier in time than the arrival of the trailing edge of a corresponding one of the pulses, the character signals continue to be supplied for impression on the member beyond the normal period therefor. When, on the other hand, the speed of the member is faster than normal such that the supply of the character signals is not completed by the time of arrival of the trailing edge of the corresponding pulse, supply of the last portion of the character signals for impression on the member is prevented so as to thereby avoid a loss of information to be recorded.

1 Claim, 8 Drawing Figures

APPARATUS FOR PROVIDING RECORDING COMPENSATION FOR ROTATING DRUM SPEED FLUCTUATIONS IN AN INFORMATION RECORDING APPARATUS

BACKGROUND OF THE INVENTION

1. Field of the Invention

The present invention relates to an information recording apparatus wherein recording irregularities caused by fluctuations in the moving speed of an image forming member are corrected.

2. Description of the Prior Art

In one type of information recording system, electrical information signals are converted into an optical image through a scanning reproducing device such as an optical fiber tube, a thin wall tube (TWT), or a laser beam scanning device. This optical image is projected onto a photosensitive substance to form thereon an electrostatic latent image which is then processed in an electrophotographic manner to be recorded on a recording sheet. In another type of system, electrical information signals are impressed on an electrostatic recording needle such that an electric discharge takes place between the needle and a dielectric substance on which an electrostatic latent image is thereby formed; this latent image is then electrophotographically processed to be recorded on a recording sheet.

In apparatus of each of these types, an electrostatic latent image forming means (such as an optical fiber tube or an electrostatic recording needle) is placed in facing relation to an image forming member (such as a photosensitive or a dielectric substance), the image forming member being usually carried on the surface of a drum arranged for constant speed rotation in one direction. The electrostatic latent image forming means electronically scans along the drum surface in the widthwise direction of the recording sheet while the image forming member is mechanically moved in the advancing direction of the recording sheet, whereby an electrostatic latent image corresponding to electrical information input to the image forming means is impressed onto the image forming member.

The revolving drum is generally rotated by a driving mechanism having a motor as a driving source. In use, fluctuations in the drum revolving speed sometimes occur, being caused by variations in the frequency of the power source, or by abrasion of the driving mechanism, or manufacturing error, resulting in irregular drum movement. The electrical information signals input to the image forming means, on the other hand, are generated at regular, predetermined intervals (in accordance with clock signals); thus, irregular movement of the image forming member negatively affects the recorded image and prevents attainment of a properly recorded image.

By way of example, for an information recording apparatus wherein characters are recorded on a sheet of regular size (such as A4, B4 or B5) in accordance with electrical information signals, 30 lines of character information can be recorded within a predetermined frame or area on A4 size paper using a certain moving speed of the image forming member. However, with fluctuations of the speed of the image forming member, 30 lines can not be included in the desired frame; depending upon the magnitude of speed changes, or when the fluctuations are extremely large, it happens that only 29 lines can be recorded. This situation not only detracts from the outward appearance of the recorded material but also results in missing information such that the information that has been recorded becomes useless. Furthermore, in a recording apparatus wherein a dot-matrix system is employed for character generation, fluctuations in the moving speed of the image forming member produce recorded characters that are distorted as well as uneven or rugged spacing between lines of recorded characters.

SUMMARY OF THE INVENTION

In order to correct uneven recording due to fluctuations in the moving speed of the image forming member, the present invention proposes an information recording apparatus having a generator of pulses related to the lines of information to be recorded on a sheet as the image forming member rotates, so that each time a pulse is input from the pulse generator, the character generator may generate character information.

The foregoing and further objects and novel features of the invention will more fully appear from the following detailed description when read in conjunction with the accompanying drawings. It is to be expressly understood, however, that the drawings are for purposes of illustration only and are not intended as a definition of the limits of the invention.

DETAILED DESCRIPTION OF THE PREFERRED EMBODIMENTS

Figure 1:
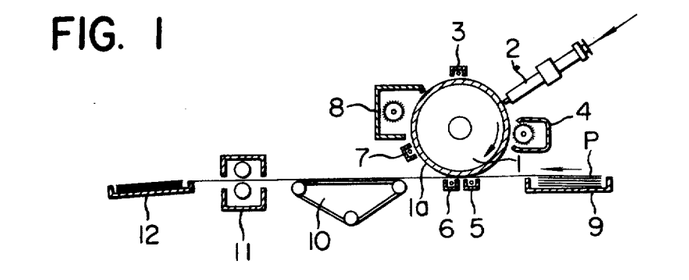
FIG. 1 is a diagrammatic view of the construction of an information recording apparatus in accordance with the present invention.

FIG. 1 illustrates an information recording apparatus in accordance with the present invention and includes a revolving drum 1 having a photosensitive substance 1a wherein selenium as photoconductive material is evaporated on the surface thereof. The apparatus further comprises a scanning reproducing device 2 for forming optical images on photosensitive substance 1a in response to received electrical information signals, a charger 3, a developing unit 4, a transfer electrode 5, a separation electrode 6, a neutralizing electrode 7 and a cleaning unit 8 arranged successively about the revolving drum 1 in the direction of its rotation. There is additionally provided a sheet feeding tray 9 for holding recording sheets and synchronously supplying them one by one during the recording operation, a paper conveyance unit 10 for transporting the recording sheets after image transfer, a fixing unit 11 for fixing developed images on the recording sheets, and a sheet delivery tray 12 for receiving the fixed recording sheets. The scanning reproducing device 2 may comprise, by way of example, an optical fiber tube, a thin wall tube, or a laser beam scanning device.

Figure 2:
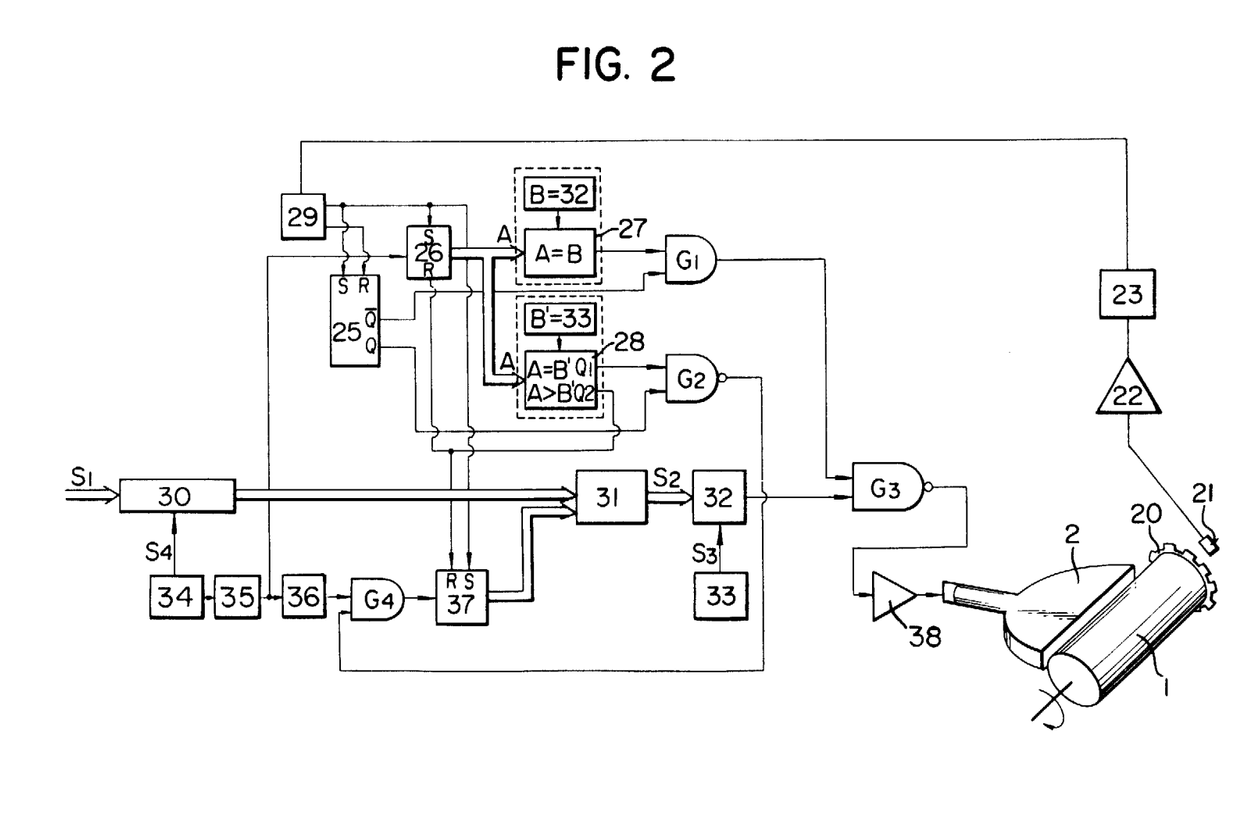
FIG. 2 is a schematic block diagram of the main circuit portion of an information recording apparatus embodying the present invention.

FIG. 2 is a block diagram of the main circuit portion of an information recording apparatus embodying the present invention. An encoder 20 having a toothed periphery is fixed to the axis of rotation of revolving drum 1 for rotation with the drum. Magnetic members are disposed on the protruding teeth of encoder 20 so that the revolving speed of the encoder can be magnetically detected as a pulse rate by a magnetic sensor 21 arranged near the protruding tooth portion. The circuit of FIG. 2 includes an amplifier 22 for the output pulse of magnetic sensor 21, a pulse-rectifying circuit 23 for rectifying the amplified pulses, and a trigger circuit 29 for generating set pulses in response to the leading edge of the pulses output from pulse-forming circuit 23. An RS flip-flop 25 is provided with a set terminal S that receives set pulses from trigger circuit 29, a reset terminal R that receives reset pulses, and output terminals Q, $\overline{Q}$ that output logic "1" or "0". A counter 26 for judging overs and shorts includes a set terminal S that receives set pulses from trigger circuit 29 and a reset terminal R, while a comparator 27 receives as its input an enumeration output A of counter 26 and generates a logic "1" when output A coincides with a predetermined set point B (e.g. B=32). The inputs of an AND gate G1 are connectioned to the $\overline{Q}$ terminal of flip-flop 25 and the output of comparator 27, respectively, and a second comparator 28 receives enumeration output A of counter 26 and generates a logic "1" when output A is equal to or larger than a predetermined set point B' (e.g. B'=33). The inputs to a NAND gate G2 are connected to the Q terminal of flip-flop 25 and output terminal Q1 of comparator 28; the second output Q2 of comparator 28 is supplied to the reset terminal R of counter 26.

In addition, a line buffer 30 receives coded information signals S1 transmitted from an external information source (e.g. a central processing unit of a computer, a data communication circuit, a keyboard, or a word processor) in an amount corresponding to one line of the scanning reproducing device. Signals S1 are then fed to a character generator 31 that generates peculiar character dot signals S2 at a specific position on the character line to there form characters corresponding to each character of the coded information signals S1. The signals S2 are input to a shift register 32 which transmits character dot signals S2 from character generator 31 to a NAND gate G3 with the aid of clock signals S3 from a clock signal generator 33.

A shift pulse generator 34 outputs shift pulses S4 to generate character code of line buffer 30 by converting one character at a time, and a character line pulse generator 35 divides the pulse stream from shift pulse generator 34 to thereby generate one pulse for every K$^{th}$ character (corresponding to one character line) where one line is composed of K characters. The output of character line pulse generator 35 is fed to both a delay circuit 36 and counter 26, while the output of delay circuit 36 is supplied to one input terminal of an AND gate G4 whose output is input to a counter 37. The counter 37 is equipped with a set terminal S that receives set pulses from trigger circuit 29 and with a reset terminal R that receives reset signals from comparator 28, and its output is supplied to character generator 31. The output of NAND gate G3 is input to scanning reproducing device 2 through an amplifier 38.

Figure 3:
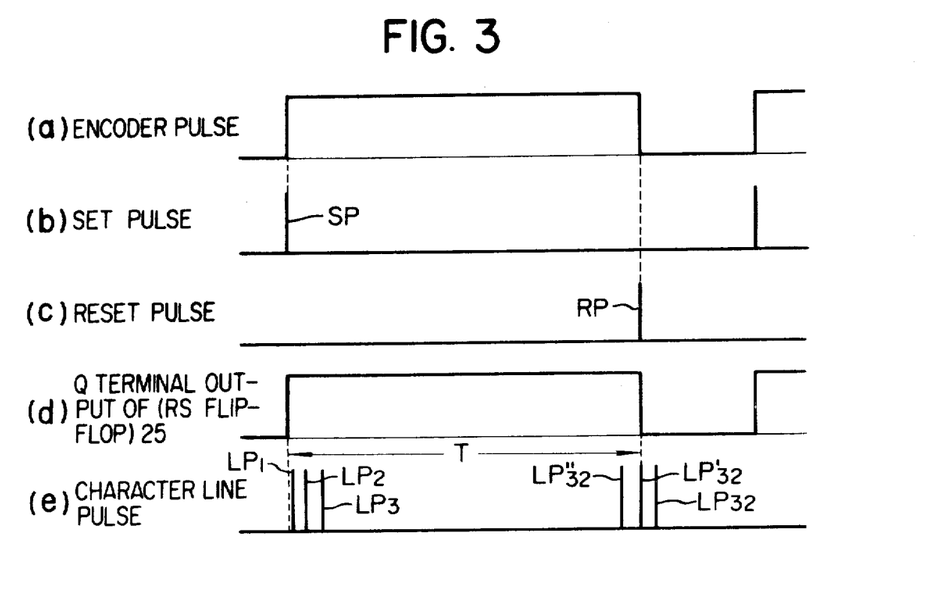
FIG. 3 is a timing chart for the circuit of FIG. 2.

Referring now to FIG. 3, the operation of this circuit will be described with respect to an apparatus incorporating a dot matrix system wherein each character is displayed in a matrix of 32 longitudinal×24 lateral dots.

As drum 1 rotates during a recording action, encoder pulses are generated (FIG. 3(a)) from magnetic sensor 21 by rotation of encoder 20. In this example, the number of protruding teeth on the periphery of encoder 20 is selected to equal the number of lines of character information to be recorded on a sheet of recording paper, and the pulse width or length is equal to the time corresponding to 32 characters per line under the standard speed of the revolving drum. Encoder pulses are saturation-amplified by amplifier 22 and then shaped to a square wave by forming circuit 23, the leading and trailing edges of the pulses being differentiated in trigger circuit 29 to generate set pulses SP and reset pulses RP, respectively (FIGS. 3(b) and 3(c)). RS flip-flop 25, counter 26, and counter 37 are set to their operation states and RS flip-flop 25 is reset by reset pulses RP. As a consequence, RS flip-flop 25 generates a logic "1" at its Q terminal and a logic "0" at its $\overline{Q}$ terminal during the period T shown in FIG. 3(d).

One character line of coded information signals S1 in line buffer 30 is generated as character (e.g., ASCII) code one character at a time by shift pulses S4 from shift pulse generator 34 and are then input to character generator 31. Shift pulses S4 from shift pulse generator 34 are also fed to character line pulse generator 35 in which they are divided to produce one pulse for every K$^{th}$ character. The character line pulses LP1, LP2, LP3, etc (FIG. 3(e)) from character line pulse generator 35 are input to counter 26 in which (being in its operation state) they are counted. The character line pulses are also fed to delay circuit 36 where they are time delayed by an amount required for the judging of overs and shorts and are then supplied to AND gate G4.

Figure 4:
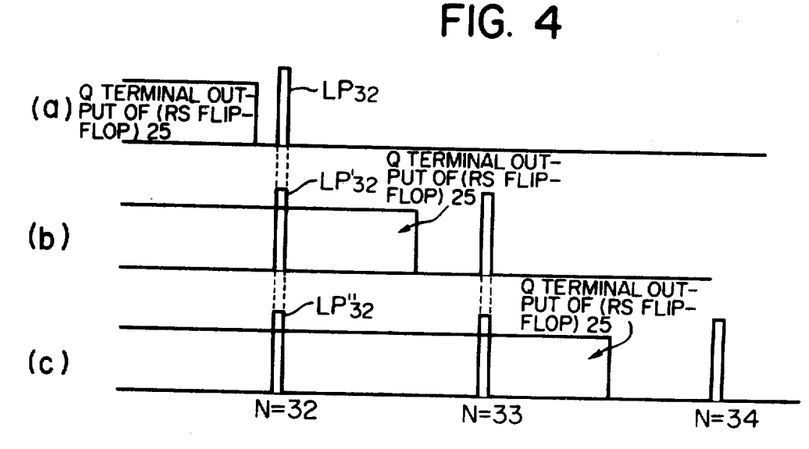
FIG. 4 is a timing chart showing FIG. 3(e) in detail.

The pulses from character line pulse generator 35 are output at a regular or constant interval while the operation state (FIG. 3(d)) of RS flip-flop 25 is determined by the continuance time or pulse width of the encoder pulse (and consequently by the revolving speed of drum 1); the relation between the last or 32nd line of character information and the operation state of RS flip-flop 25 is therefore shown in FIG. 3(e). This relation is detailed in FIG. 4 wherein FIG. 4(a) shows the situation in which the revolving speed of the drum is higher or faster than standard and resetting of RS flip-flop 25 occurs earlier than the arrival of the 32nd character line pulse LP32. In FIG. 4(b), the revolving speed of the drum is equal to the standard speed and resetting of RS flip-flop 25 is synchronized with the arrival of the 32nd character line pulse LP32, while FIG. 4(c) illustrates the situation in which the revolving speed of the drum is slower than standard and resetting of RS flip-flop 25 occurs later than the arrival of the 32nd character line pulse LP32. Each of these three cases will be separately considered.

(I) FIG. 4(a)

Counter 26 counts character line pulses and generates a counted output A to comparator 27; when output A from counter 26 becomes equal to a predetermined, preset value B, a logic "1" is generated from comparator 27. On the other hand, the logic "0" initially generated at the $\overline{Q}$ terminal of RS flip-flop 25 becomes a logic "1" when RS flip-flop 25 is reset *before* the 32nd character line pulse LP32 is generated, resulting in AND gate G1 being opened as soon as counter 26 counts the 32nd character line pulse LP32. As a consequence, the character dot signals S2 from character generator 31 and corresponding to the 32nd character line pulse LP32 are obstructed by NAND gate G3 and are not supplied to scanning reproducing device 2.

In this situation, recording compensation is provided for faster than standard drum speed fluctuations by preventing character dot signals corresponding to the 32nd character line pulse from being generated or, in other words, by composing characters with only the character dot signals corresponding to the first 31 character line pulses.

(II) FIG. 4(b)

In this case, the output of the $\overline{Q}$ terminal of RS flip-flop 25 is still a logic "0" when the 32nd character line pulse LP'32 is generated and AND gate G1 therefore remains closed. This enables the character dot signals S2 from character generator 31 corresponding to this 32nd character line pulse LP'32 to pass through NAND gate G3 and be input to scanning reproducing device 2.

Thus, no compensation is either performed or required when the moving speed of the revolving drum is equal to or only slightly slower than the standard speed—i.e., as shown in FIG. 4(b), when resetting of RS flip-flop 25 occurs between the 32nd character line pulse LP'32 and the 33rd character line pulse LP33.

(III) FIG. 4(c)

When counter 26 counts the 32nd character line pulse LP''32, comparator 27 generates a logic "1" but, at the same time, the $\overline{Q}$ terminal of RS flip-flop 25 outputs a logic "0" whereby AND gate G1 remains unopened. A logic "0", on the other hand, is generated at the Q1 terminal of comparator 28 and a logic "1" is generated at the Q terminal of RS flip-flop 25, and NAND gate G2 is thereby opened to input a logic "1" to AND gate G4. As a consequence, the 32nd character line pulse LP''32 is time delayed at delay circuit 36 and then passes through AND gate G4 to counter 37. Since the character line pulses from character line pulse generator 35 are also input to AND gate G4 after passing through counter 26, comparator 28 and NAND gate G2, they are time delayed at delay circuit 36 by an amount in accordance with the operating or starting time of each of these elements, or by the time required for judging overs and shorts of the character lines. When counter 26 receives the 33rd character line pulse LP33, the output at the Q1 terminal of comparator 28 is reversed from the previous logic "0" to a logic "1" and, at this time, a logic "1" is generated at the Q terminal of RS flip-flop 25, whereby NAND gate G2 is closed. AND gate G4 is thereby closed and the output of character line pulse generator 35 is not fed to counter 37; the counting output of counter 37 thus does not change and character generator 31 accordingly continues to generate the 32nd character line dot signals. When RS flip-flop 25 is subsequently reset, the output at its Q terminal is reversed to a logic "0" and the output at the Q1 terminal of comparator 28 becomes logic "0" whereby NAND gate G2 is again opened and AND gate G4 is enabled to pass the output of delay circuit 36. When the 34th character line pulse LP34 is thereafter generated, a logic "1" is outputted at the Q2 terminal of comparator 28 and, with this output, counters 26 and 37 are reset.

In this case, then, recording compensation is accomplished by having the character dot signals corresponding to the 32nd character line pulse generated continuously for the 33rd character line pulse because the revolving speed of the drum is slower than standard.

It should now be clear that in the circuit of FIG. 2, the set pulse is generated by rotation of the drum utilizing the leading edge of the encoder pulse picked up from magnetic sensor 21, and this set pulse triggers counter 37 to count the character line pulses that compose the characters. The trailing edge of the encoder pulse is utilized to generate the reset pulse which is sequentially compared with the last pulse of the character line pulse composing the aforesaid one character. When the reset pulse arrives earlier than the last character line pulse (i.e. the revolving speed of the drum is faster than standard), the character dot signals corresponding to the last character line pulse are prevented from being output from the character generator. When the reset pulse arrives later than the last character line pulse (i.e. the revolving speed of the drum is slower than standard), on the other hand, the character dot signals corresponding to the last character line pulse are generated again. Recording irregularities caused by fluctuations in the revolving speed of the drum—the moving speed of the image forming member—are therefore compensated.

In the apparatus of the present example it is possible to compensate for such recording irregularity, by adjusting the number of character lines in accordance with the fluctuation in moving speed of the image forming member, where there is provided a constant scanning cycle of the electrostatic latent image forming means. In alternatively compensating for this recording irregularity by adjusting the scanning cycle through a change in the inductance (L) and capacitance (C) of the deflection circuit, a transient phenomenon occurs and fluctuations in deflection amplitude result due to the radical scanning speed; this serious problem is avoided with the present invention.

Figure 5:
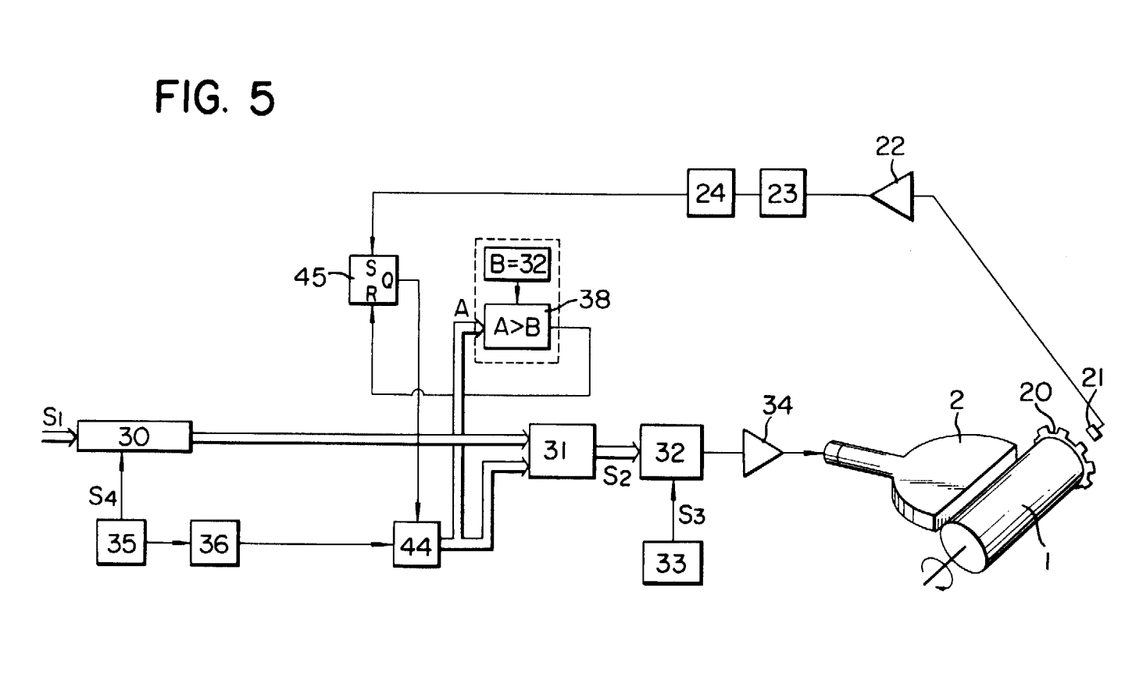
FIG. 5 is a schematic block diagram of the main circuit portion of another information recording apparatus embodying the present invention.

FIG. 5 is a block diagram of the main circuit portion of another information recording apparatus embodying the present invention.

In this alternative construction, an encoder 20 having a toothed periphery is fixed to the axis of drum 1 for rotation therewith. The teeth are provided with magnetic pieces so that a magnetic sensor 21 arranged nearby can magnetically detect the revolving speed of encoder 20 as a pulse rate. An amplifier 22 amplifies pulses output from magnetic sensor 21, a pulse rectifying circuit 23 rectifies these amplified pulses, a trigger circuit 24 generates a set pulse at the leading edge of the pulses output from pulse-rectifying circuit 23, and an RS flip-flop 45 receives set pulses output from trigger circuit 24 at its terminal S and reset signals at its reset terminal R to output a logic signal of "1" or "0" at its output terminal Q.

A line buffer 30 stores part of a coded information signal S1 which is transmitted from an external information source (such as a CPU of a computer system, a data communication line, a keyboard, or a word processor) and which corresponds to a single line of the scanning reproduction device, a character generator 31 generates a proper character dot signal S2 at a specific position of a plurality of character dot lines corresponding to individual characters of the coded signal S1, and a shift register 32 is triggered by clock pulses S3 from a clock signal generator 33 to transfer the character dot signal, character dot line by character dot line, from character generator 31 to scanning reproducing device 2 through an amplifier 34. A shift pulse generator 35 generates shift pulses S4 which cause line buffer 30 to output character codes, character by character, and a character line pulse generator 36 divides the frequency of the shift pulses from shift pulse generator 35 producing, for example, one pulse every K characters when a line comprises K characters (namely, one pulse per character line). A counter 44 advances as a logic signal "1" is output from terminal Q of RS flip-flop 25 to count pulses from character line pulse generator 36 corresponding to the character lines. A digital comparator 38 receives the count signal from counter 44 at its input A, compares the same to preset level B, and outputs a logic "1" when its input A is larger than level B. This output signal from digital comparator 38 is delivered to the reset terminal R of flip-flop 45.

The recording system of FIG. 5 operates in the following manner.

Figure 6:
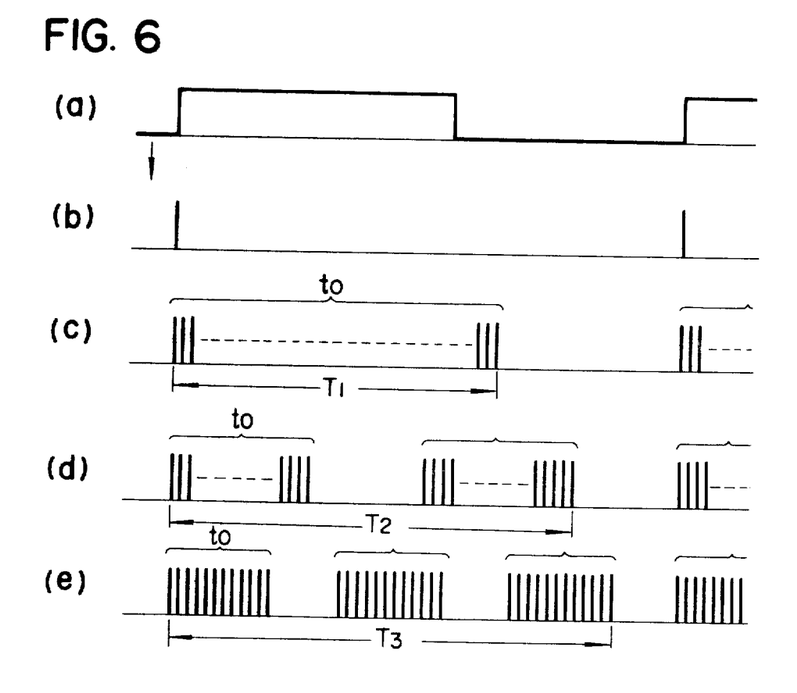
FIG. 6 is a timing chart illustrating signal wave patterns generated at critical points in the circuit of FIG. 5.

As drum 1 and encoder 20 synchronously rotate during a recording operation, encoder pulses are output from magnetic sensor 21 (FIG. 6(a)). These encoder pulses may have an arbitrary width and are spaced to correspond to the pitch between lines of character information to be recorded on a copy sheet. The encoder pulses are amplified to saturation by amplifier 22 and rectified by pulse-rectifying circuit 23 into square pulses. The leading edge of these square pulses is differentiated by trigger circuit 24 to generate a train of set pulses (FIG. 6(b)) for application to the set terminal S of flip-flop 45. As a result, flip-flop 45 outputs a logic "1" at its terminal Q, which is applied to counter 44 to place it in its operating mode.

A line of a coded information signal S1 stored in line buffer 30 is transferred character by character into character generator 31 in the form of character (for example, ASCII) code each time a shift pulse S4 arrives from shift pulse generator 35. Shift pulses from pulse generator 35 are also applied to character line pulse generator 36 for frequency division so that a pulse is generated every K characters for application to counter 44.

Where each character is represented by a dot matrix of 32 columns and 24 rows, and based on the count output from counter 44 (FIG. 6(c)), character generator 31 generates a dot signal S2 from the first character line, switching over to successive character lines to generate a dot signal corresponding to the individual character lines (each character comprising 32 character lines).

The dot signal S2 from character generator 31 is transferred to shift register 32 for application to scanning reproduction device 2 as clock signal generator 33 generates a clock signal S3. Characters that comprise a line of character information are thus sequentially formed. Since level B is preset to N=32, digital comparator 38 outputs a logic "1" as output A of counter 44 advances to 33 and satifies the inequality A>B. As a result, flip-flop 45 is reset to output a logic "0" at its terminal Q, and counter 44 is thereby also reset to await the next encoder pulse whereby flip-flop 45 will again output a logic "1" at its terminal Q.

The circuit of FIG. 5 is so designed that the leading edge of the encoder pulses generated from magnetic sensor 21 as drum 1 revolves is used to generate a signal to trigger counter 44, and the generation of character dot signals is terminated as counter 44 counts up to the present number of character lines. Thus, if the rim of encoder 20 is provided with a particular number of teeth or protruding portions, the corresponding number of encoder pulses will be output for each revolution of the drum regardless of its rotative speed. If the number of these protruding portions is so selected to correspond to the pitch of the character lines to be recorded in a prescribed portion of a copysheet, individual character lines will always be recorded at the prescribed pitch. As the rotative speed of the drum fluctuates, the spacing between adjacent characters in individual lines will change, but the pitch remains constant; since the number of character lines recorded on a copy sheet is constant, loss of information to be recorded or other fatal defects in recording can be avoided.

The embodiment of FIG. 5 is so constructed that a train of set pulses as illustrated in FIG. 6(b) is generated from encoder pulses shown in FIG. 6(a), and each of these set pulses causes the character generator to generate a character signal for a certain period of time T1 as illustrated in FIG. 6(c). In this arrangement, a set pulse drives the character generator for a time $t_o$ to output a character. However, the circuit may be so designed that, as illustrated in FIG. 6(d) or FIG. 6(e), a set pulse drives the character generator for a time T2 or T3 to output 2 or 3 characters, respectively.

Figure 7:
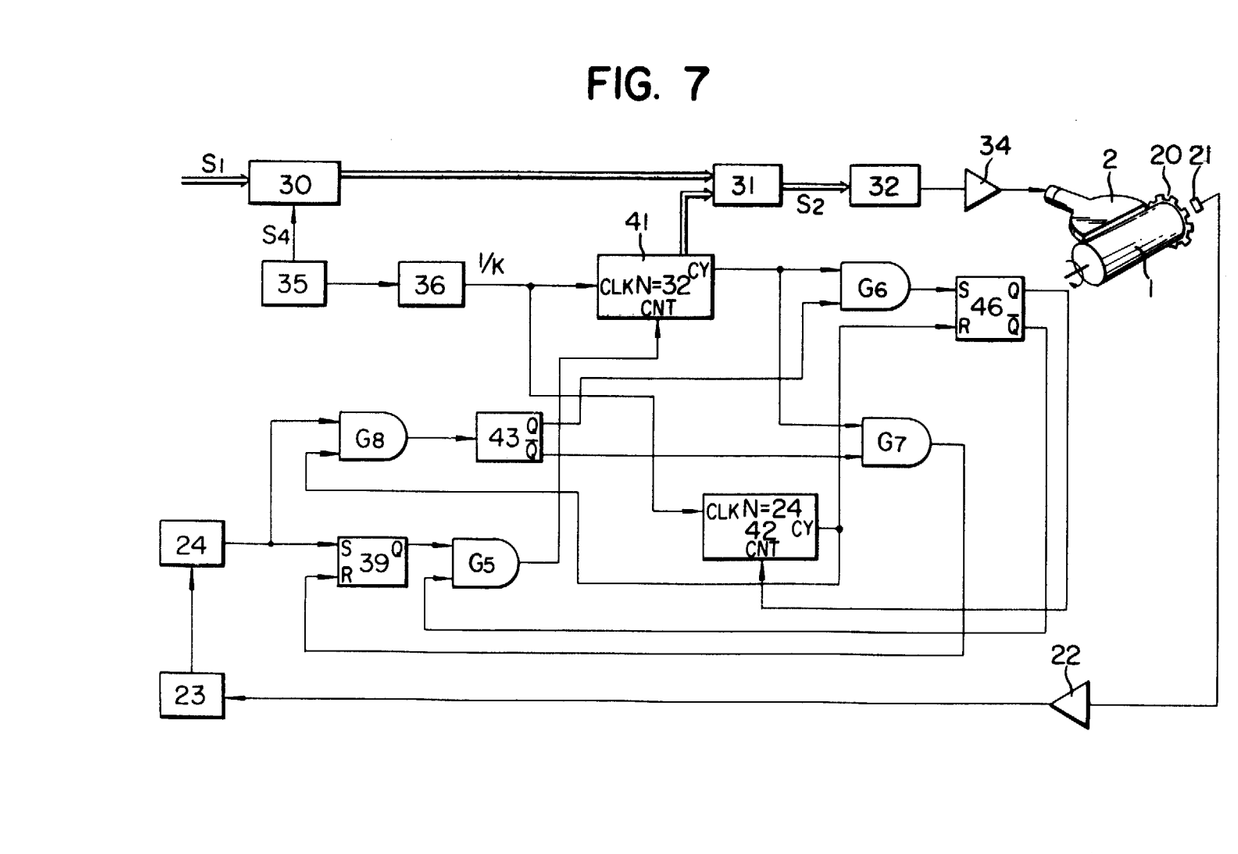
FIG. 7 is a schematic block diagram of the main circuit portion of still another information recording apparatus embodying the present invention.
Figure 8:
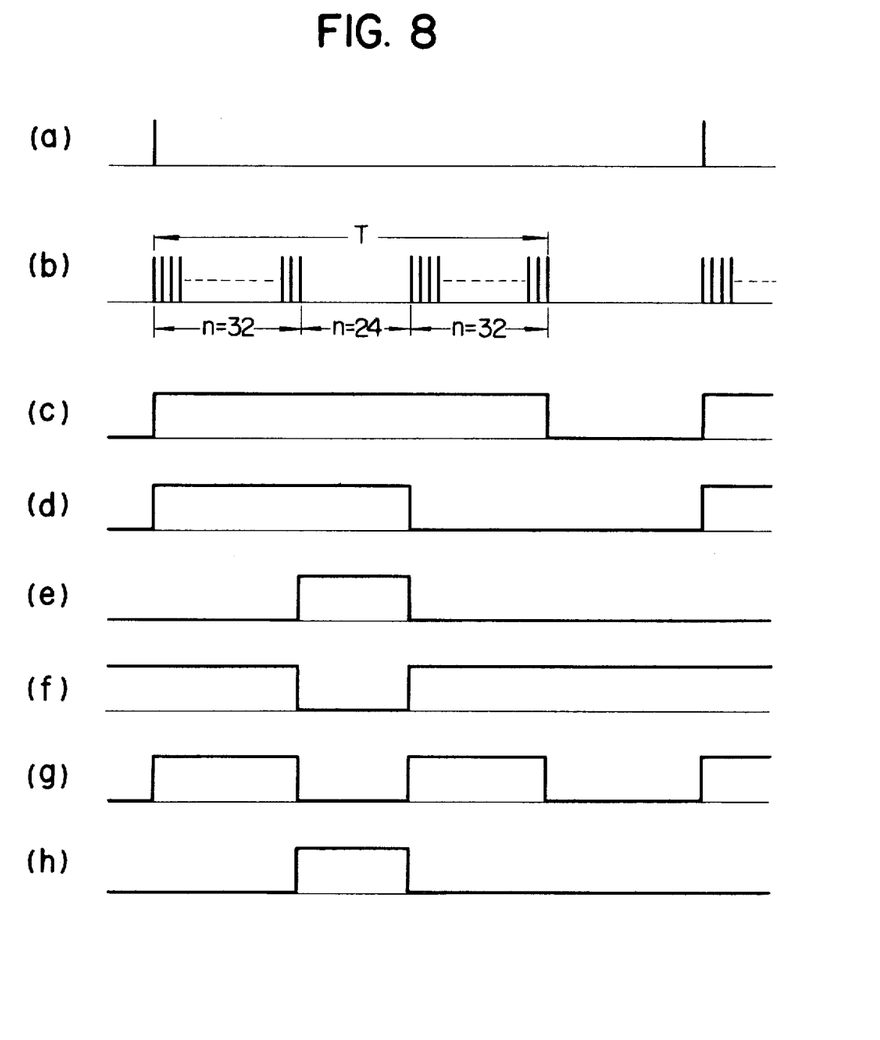
FIG. 8 is a timing chart illustrating signal wave patterns generated at critical points in the circuit of FIG. 7.

Another embodiment of the present invention, in which the character generator outputs a character signal corresponding to 2 characters as a set pulse, is shown in FIGS. 7 and 8. FIG. 7 is a block diagram of the main circuit portion in which like reference numbers refer to the same components as in FIG. 5, while FIG. 8 is the operation timing chart of the circuit. In FIG. 7, there are provided RS flip-flops 39 and 46 each having a set terminal S and a reset terminal R, AND gates G5, G6, G7 and G8, a first preset counter 41 having a clock terminal CLK, a control terminal CNT and a carry terminal CY, a second preset counter 42 having the same construction as first counter 41, and a flip-flop 43.

If each character is represented by a dot matrix of 32 columns and 24 rows, characters are composed of 32 character lines in the lengthwise direction. Thus, if a set pulse is to drive the character generator for a time sufficient to output 2 characters, as illustrated in FIGS. 8(a) and 8(b), and where 24 space character lines are inserted between individual characters, the circuit may be so constructed that in a train of character line pulses from character line pulse generator 36 the first n=32 lines are transferred through counter 41 to character generator 31 and, after a pause corresponding to n=24 character lines, the second n=32 lines are transferred to the character generator.

In the circuit of FIG. 7, trigger circuit 24 generates set pulses as illustrated in FIG. 8(a) using the output from encoder 20. As a result, RS flip-flop 39 is set and generates an output seen in FIG. 8(c) at its terminal Q. This output is applied through AND gate G5 to the control terminal CNT of first preset counter 41, whereby the character line pulses transmitted from character line pulse generator 36 are counted. The output from first preset counter 41 is applied to character generator 31 to sequentially output the character signal.

The set signal based on the output from encoder 20 is also transmitted to flip-flop 43 through AND gate G8 to set this flip-flop to output a logic "1" at its terminal Q as illustrated in FIG. 8(d). First preset counter 41 generates a carry pulse at its terminal CY as its count reaches n=32. This carry pulse and the output from terminal Q of flip-flop 43 opens AND gate G6, so that flip-flop 46 is thereby set and outputs a logic "1" at its terminal Q as illustrated in FIG.8(e). This logic "1" is applied to control terminal CNT of second preset counter 42 (FIG. 8(h)) which counts character lines corresponding to the spacing between adjacent characters to be printed. As second preset counter 42 reaches n=24, a carry pulse is generated from its terminal CY, which resets flip-flop 46 and also resets flip-flop 43 through AND gate G8. The logic "1" that is generated at terminal $\overline{Q}$ of flip-flop 46 (FIG. 8(f)) and the output from terminal Q of flip-flop 39 (FIG. 8(c)) are applied through AND gate G5 to the control terminal CNT of first preset counter 41 (as illustrated in FIG. 8(g)) which counts the character line pulses, and character generator 31 resumes its generation of character signals.

As the count of first preset counter 41 reaches n=32, it again outputs a carry pulse at its terminal CY. However, since the output from terminal Q of flip-flop 43 is logic "0", the aforementioned carry pulse cannot pass through AND gate G6 and, therefore, fails to set flip-flop 46. As a result, second preset counter 42 does not count, and this operating cycle is thus terminated.

Meanwhile, using the carry pulse from first preset counter 41 and the output of terminal $\overline{Q}$ of flip-flop 43, AND gate G7 outputs a logic "1", and flip-flop 39 is thereby reset to await receipt of the next set pulse.

The foregoing embodiments comprise information recording apparatus utilizing an optical fiber tube for the scanning reproducing device. However, the present invention is not so limited, being also applicable to an information recording apparatus making use of an electrostatic recording needle and a dielectric member, or an information compounding apparatus for recording compound images by combining original images and electrically coded images, or other like devices.

The image forming member of the present invention is one in which an electrostatic latent image can be formed on its surface by an electrostatic latent image forming means through electrical information signals, and it may also be one whose surface is uniformly charged in advance and the electric charge is thereafter neutralized by light. It might alternatively be one wherein the electric charge on its surface is neutralized in advance and an electric charging thereafter performed by an electrostatic recording needle in accordance with the image to be recorded. The image forming member of the present invention may comprise a photosensitive substance made from photoconductive materials such as selenium, zinc oxide, cadmium sulfide or organic photoconductive material, or a dielectric substance formed of insulating material. The electrostatic latent image forming means in the present invention may comprise a means wherein electrostatic latent images are formed by a light-emitting means such as a cathode-ray or optical fiber tube, a thin wall tube or a laser beam scanning device, or a means wherein electrostatic latent images are formed by a charging means such as an electrostatic recording needle.

As a recording substance in the present invention, an ordinary paper sheet is popular and the surface of this sheet may be treated so that toner images can readily be retained thereon. A recording substance whose surface is treated to have insulation properties may be used.

Generally, an image forming member on which electrostatic latent images are recorded by the present invention moves and is developed with developer at a developing unit to form toner or visible images. These toner images are then transferred to a transfer paper fed by a sheet feeding means, and the transfer paper bearing toner images is separated from the image forming member, is given a heat fixing at a fixing unit to convert the toner images to permanent images, and is delivered out of the apparatus, whereby the recorded information is obtained.

The electrostatic latent images formed on the image forming member may be transferred to a recording substance whose surface is treated for insulation properties and these transferred electrostatic latent images then converted to visible images with the aid of developer.

References to characters in this disclosure of the present invention should be understood to include letters of the alphabet, numerals, katakana and simple diagrams.

What is claimed is:

1. An apparatus for recording information on a recording member, comprising:

a movable image forming member;

a character generator for generating character signals corresponding to information sequentially input thereto;

means for forming an electrostatic latent image on said image forming member in accordance with the character signals generated by said character generator, said image forming means being operable to form images on said image forming member by line-by-line scanning of said member with the character signals;

means for generating a train of pulses related in number to the number of lines of information to be recorded on the recording medium as said image forming member moves a predetermined distance;

means for causing said character generator to generate a character signal each time it receives a pulse from said pulse generating means; and means for continuing to supply the last scanning portion of said character signals from said character generator to said image forming means when said last scanning portion of the character signals is completed earlier in time than the arrival of the trailing edge of a corresponding one of said pulses at said means for causing the generation of a character signal, and for preventing the supply of said last scanning portion of said character signals from said character generator to said image forming means when said last scanning portion of the character signals is not completed by the time of arrival of the trailing edge of a corresponding one of said pulses at said means for causing the generation of a character signal.

* * * * *